June 14, 1927.

E. PRICE ET AL 1,632,042

ADJUSTABLE UNION

Filed Oct. 5, 1925

INVENTOR.
Emil Price
BY William A. Pfister
Nestall and Wallace
ATTORNEYS.

Patented June 14, 1927.

1,632,042

UNITED STATES PATENT OFFICE.

EMIL PRICE AND WILLIAM A. PFISTER, OF LOS ANGELES, CALIFORNIA.

ADJUSTABLE UNION.

Application filed October 5, 1925. Serial No. 60,458.

This invention relates to a fitting adapted for adjustably connecting an outlet pipe to a fixture. The invention is herein illustrated as forming an element of a combination faucet structure which serves to mix hot and cold water and deliver the same through a single spout.

It is now a common practice to extend horizontally through vertical walls of a building structure companion hot and cold water supply pipes for delivering water therefrom. It is standard practice to space the pipes on eight inch centers and to connect both to a bridge conduit member from which a common spout extends at the center. Two faucet valves are used in the fixture, one for controlling the flow of hot water and the other for controlling the flow of cold water. Due to inaccuracy in installation of the supply pipes, to disturbance of them after the plumbing has been "roughed in" and to various other causes, the pipes usually are not spaced or separated on eight inch centers accurately enough to permit the connection of a rigid combination faucet without bending or twisting the supply pipes. The present invention contemplates the provision of a union which adjustably adapts the faucet to the actual spacing. Another object of this invention is the provision of a union which is compact, simple in structure, ornate in appearance and economical to manufacture.

Figure 1:
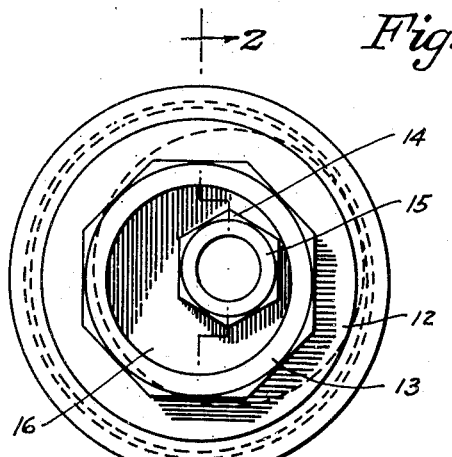
Figure 2:
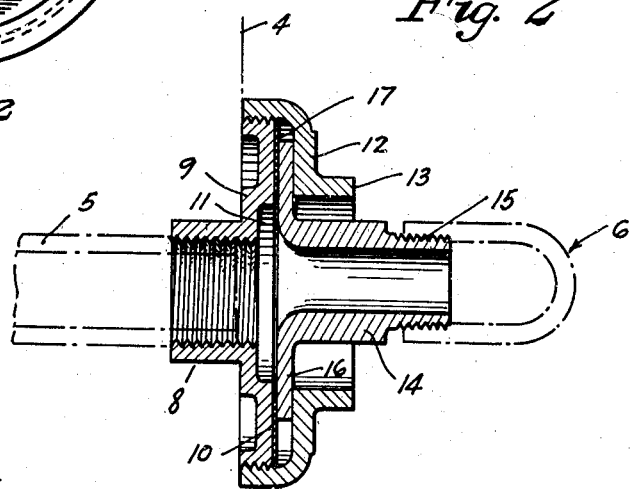
Figure 3:
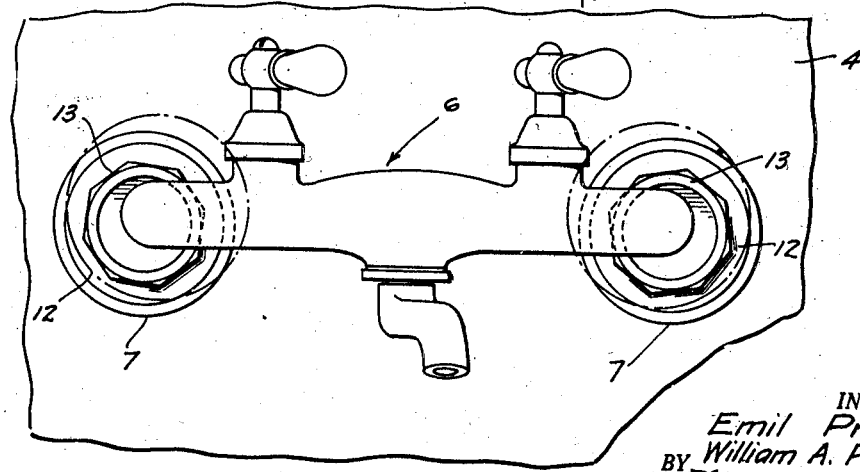

These objects together with other objects and corresponding accomplishments are obtained by means of the embodiment of our invention illustrated in the accompanying drawing, in which:

Fig. 1 is a front elevation of the union; Fig. 2 is a section as seen on the line 2—2 of Fig. 1, the union being indicated as mounted against a wall, the supply pipe to which it is connected being indicated in dot and dash lines and a portion of the combination fixture in dot and dash lines; Fig. 3 is a front elevation of an installation including the combination faucet and two of our improved unions.

Referring more particularly to Fig. 3, a vertical wall in a building structure is indicated by 4.

Extending through the wall in a horizontal direction are spaced hot and cold water outlet pipes. In Fig. 2, one of these pipes is indicated by 5. A combination faucet fixture indicated generally by 6 is connected to the hot and cold water supply pipes by means of unions 7. These unions embody the inventive features and are the same in structure so that only one will be described.

Referring more particularly to Figs. 1 and 2, a nipple indicated by 8 is provided with a flange 9 which is threaded on its outer edge. The outer face of the flange is flat as indicated by 10, and suitable wrench holds 11 are provided for screwing the nipple into place upon the pipe 5. A canopy member 12 is provided with an internal thread so that the member may be engaged with the flange 9. It may be provided with a tubular extension 13 which is formed on its outside with an hexagonal wrench hold for screwing it into place. A nipple 14 externally threaded as indicated by 15 for connection to the combination faucet 6 is provided with a shiftable flange 16. The nipple has an hexagonal wrench hold formed thereon, and the shiftable flange 16 is of less diameter than the internal diameter of the canopy 12. A ring gasket 17 is placed between the flanges to pack the joint. The internal diameter of the tubular member 13 is greater than the external diameter of the nipple 14. This permits the faucet nipple to be shifted or floated into its proper position, and canopy 12 tightened so as to hold the faucet nipple in its selected position.

The construction is such as to permit a limited adjustment of the faucet nipple in all directions lying in one plane. The fitting is such that it may be easily installed, is ornate in appearance, and will serve the same purpose as a flange to cover the opening in the wall.

What we claim is:

1. A union comprising a pair of nipple members having flanges disposed to face one another, one of said flanges being arranged to be laterally shiftable over the face of the other so as to adjust the relative positions of their axes, and means to clamp the flanges together in any adjusted position so as to form a leak tight joint.

2. A union comprising a pair of nipple members having flanges disposed to face one another, one of said flanges being arranged to be laterally shiftable over the face of the other so as to adjust the relative positions of their axes, and a canopy engaged with one flange and embracing the other flange so as to clamp the flanges together in any adjusted position forming a leak tight joint.

3. A union comprising a pair of nipple members having flanges disposed to face one another, one of said flanges being of lesser diameter than the other and arranged to be laterally shiftable over the face of the other so as to adjust the relative positions of their axes, the larger flange being externally threaded, and a canopy having an internal thread for engagement with the thread on the larger flange and embracing the other flange, said canopy having a central opening so as to permit adjustment of the nipples with respect to one another and to clamp the flanges together in any adjusted position so as to form a leak tight joint.

4. A union comprising a pair of nipple members having flanges disposed to face one another, one of said flanges being of lesser diameter than the other flange and laterally shiftable thereover, the larger flange being externally threaded, a ring gasket between said flanges, and a canopy internally threaded so as to engage the thread on the larger flange and embrace the other flange whereby to clamp the flanges together, there being an opening in said canopy so as to permit the nipple members to be adjusted with respect to one another by shifting one flange over the face of the other and then clamping the flanges together in adjusted position.

5. A fixture comprising a bridge conduit in combination with parallel spaced supply pipes, and unions connecting said bridge member and said supply pipe, each union comprising a pair of nipple members having flanges disposed to face one another, one of said flanges being arranged to be laterally shiftable over the face of the other so as to adjust the relative positions of their axes, and means to clamp the flanges together in any adjusted position so as to form leak tight joints.

6. A device of the class described comprising the combination of a bridge conduit fixture, spaced parallel supply pipes, and unions connecting said bridge conduit member to said supply pipe, each union comprising a pair of nipple members having flanges disposed to face one another, one of said flanges being arranged to be laterally shiftable over the face of the other flange so as to adjust the relative positions of their axes, and a canopy engaged with one flange and embracing the other flange so as to clamp the flanges together in any adjusted position and form a leak tight joint.

7. A device of the class described comprising the combination of a bridge conduit member, a pair of spaced parallel supply pipes and unions connecting said bridge member and said pipes, each union comprising a pair of nipple members having flanges disposed to face one another, one of said flanges being of less diameter than the other, the larger flange being externally threaded, a canopy engaged with the threaded flange and embracing the other flange permitting the smaller flange to be laterally shifted over the face of the larger flange so as to adjust the relative positions of the axes of the nipple members and to clamp the flanges together in selected position so as to form a leak tight joint.

8. In a device of the class described, the combination of a mixing member, horizontal supply pipes, connecting members and means including unions slidable transversely of said connecting members for connecting the mixing member with said supply pipes.

9. In a device of the class described, the combination of a mixing member, a pair of spaced horizontal supply pipes, connecting members, means including unions slidable transversely of said connecting members, for connecting the mixing member with the said horizontal supply pipes, and valves for controlling the flow of fluid from the said supply pipes to the mixing member.

10. In a device of the class described, the combination of a connecting member adapted to be secured to a supply pipe and having a head formed thereon, and a nut member having an enlarged bore and being adapted to be screw-threaded to a second pipe, the said coupling member having its head inserted in the enlarged bore so as to permit relative adjustment of the said nut and coupling members in a plane transverse to their center lines.

In witness that we claim the foregoing we have hereunto subscribed our names this 25th day of September, 1925.

EMIL PRICE.
WILLIAM A. PFISTER.